(12) United States Patent
Saedi et al.

(10) Patent No.: US 11,701,603 B2
(45) Date of Patent: Jul. 18, 2023

(54) POOL FILTER CORE

(71) Applicant: Optimum Pool Technologies, Inc., Nampa, ID (US)

(72) Inventors: Robert Saedi, Nampa, ID (US); Brandon Saedi, Meridian, ID (US); Thomas Saedi, Meridian, ID (US)

(73) Assignee: Optimum Pool Technologies, Inc., Nampa, ID (US)

( * ) Notice: Subject to any disclaimer, the term of this patent is extended or adjusted under 35 U.S.C. 154(b) by 0 days.

(21) Appl. No.: 17/486,762

(22) Filed: Sep. 27, 2021

(65) Prior Publication Data

US 2023/0104919 A1 Apr. 6, 2023

(51) Int. Cl.
*B01D 29/21* (2006.01)

(52) U.S. Cl.
CPC ........ *B01D 29/21* (2013.01); *B01D 2201/0415* (2013.01); *B01D 2201/127* (2013.01); *B01D 2201/29* (2013.01); *B01D 2201/602* (2013.01)

(58) Field of Classification Search
CPC ............ B01D 29/21; B01D 2201/0415; B01D 2201/127; B01D 2201/29; B01D 2201/602
See application file for complete search history.

(56) References Cited

U.S. PATENT DOCUMENTS

| | | | |
|---|---|---|---|
| 3,016,984 A * | 1/1962 | Getzin | B01D 46/24 55/501 |
| D306,640 S | 3/1990 | Kott | |
| 4,921,600 A | 5/1990 | Meissner | |
| 5,192,346 A | 3/1993 | Kowalczyk | |
| 5,211,846 A | 5/1993 | Kott et al. | |
| D402,735 S | 12/1998 | Kott | |
| D403,740 S | 1/1999 | Kott et al. | |
| 6,721,483 B2 * | 4/2004 | Grubish et al. | G02B 6/4444 385/139 |
| 7,416,663 B2 | 8/2008 | Kott et al. | |
| 8,741,139 B2 | 6/2014 | LaCroix et al. | |
| 10,765,972 B2 | 9/2020 | Faber et al. | |
| 10,918,979 B2 | 2/2021 | Medina et al. | |

* cited by examiner

*Primary Examiner* — Waqaas Ali
(74) *Attorney, Agent, or Firm* — Anooj Patel; Kevin Schraven; Hankin Patent Law APC (57) ABSTRACT

A pool filter core, comprising two portions, a first portion and a second portion, wherein each of the two portions may be halved or truncated cylinders, wherein the portions are configured to engage one another along the vertical edges of the portions, such that when the portions engage one another, an open cylinder is formed that is configured to support a filter substrate and allow for water to flow from outside to inside.

15 Claims, 13 Drawing Sheets

POOL FILTER CORE

FIELD OF USE

The present disclosure generally relates to pool filters, and more specifically a two-component pool filter core that is easier to manufacture, store, transport, and use than what currently exists.

BACKGROUND

Pools require a significant amount of effort to be properly and safely maintained. In addition to chemical cleaning, it is important to filter the water to remove debris and other contaminants. Because pools are usually outdoors, pools frequently accumulate a great deal of debris.

The general principle behind the most common types of filtration systems used in pools is pushing the pool water through a filter and returning the filtered water to the pool. Because pools are large, the filters involved must be large and efficient. One solution to increasing the amount of filter substrate usable at one time is to use a cylindrical core that is wrapped with a pleated filter material. Pool water is generally pulled from the outside of this filter through the center of the cylinder, and out the top or bottom to be returned to the pool.

Because the amount of water filtered is so large, the pressure used to filter the pool water tends to be relatively high, meaning that the core that provides support to the filter substrate needs to be strong and resilient to function properly. Accordingly, many pool filter cores comprise a single unitary piece to reduce the number of potential points of failure. However, because the cylindrical core design requires water to flow from outside to in, the cylinder must also be perforated in some way in order to allow water to flow. Thus, some pool filter core designs comprise a cylindrical tube that is extruded and then has holes punched out of the surface. This manufacturing process is relatively difficult, time consuming, wasteful, and inefficient. This manufacturing technique also limits the amount of surface area of the pool filter core that may be removed, thereby unnecessarily restricting the water flow through the filter.

Additionally, different pools require different sized filters and configurations. Thus, the filter core needs to be of different lengths depending on application. Because pool cores are generally a single cylindrical piece, cutting the cylinder is generally not easy or advisable and may result in additional instability or eventual structural failure.

What is needed, is a pool core that is easier to manufacture, transport, allows for increased water flow speed, and may be adjustable to fit the needs of the user.

SUMMARY OF EMBODIMENTS

Various embodiments of the present disclosure may be directed to a pool filter core and manufacture thereof. The pool filter core may comprise two portions configured to matingly engage one another, a plurality of water flow holes, a plurality of reinforcement strips, and a plurality of locking components. Filter substrate materials may be affixed to the exterior of the pool filter core and secured via bands and caps.

In one embodiment a pool filter core may comprise two portions; wherein the two portions may comprise a first portion and a second portion; wherein each of the portions may be substantially partially cylindrical in shape; wherein the two portions each may comprise a plurality of holes; wherein each of the two portions each may comprise two vertical edges, a first vertical edge and a second vertical edge; and wherein the two portions may be configured to engage with each other, such that a substantially cylindrical pool filter core may be formed. The two portions each may comprise a plurality of engagement mechanisms. The plurality of engagement mechanisms may comprise one or more cavities and one or more prongs that may be configured to matingly engage with each other; and wherein the plurality of engagement mechanisms may be located along each of the two vertical edges of each of the two portions. The two portions may comprise the one or more cavities along the first vertical edge and the one or more prongs along the second vertical edge. The first portion may comprise the one or more cavities along both of the vertical edges; and the second portion may comprise the one or more prongs along both of the vertical edges. The two portions may be configured to matingly engage one another along the vertical edges to form the substantially cylindrical pool filter core. Each of the two vertical edges of the two portions may comprise an alignment edge, such that there may be four alignment edges. Each of the four alignment edges may be either a lip edge or lip receiving edge. The two portions, when engaged with each other, may be configured to receive one or more caps; and the two portions, when engaged with each other, may be configured to be connected to a pleated filter substrate. Each of the two portions may comprise a plurality of reinforcement strips; and each of the two portions may comprise at least one length reduction plane. Each of the at least one length reduction planes may be orthogonal to a transverse axis of the substantially cylindrical pool filter core; and each of the at least one length reduction planes may be directly adjacent to the reinforcement strips. Each of the two portions may comprise a plurality of reinforcement tabs. The portions may be approximately 25 to 34 inches or 63.5 to 86 centimeters in length. The length reduction planes may be located 13.813, 13.875, 19.313, 19.688, 25.188, 25.750, 26.688, and 31.750 inches or 35, 49, 63, 67, and 80 centimeters from one end of the portions. The plurality of holes may be rounded rectangles. The portions may be made of acrylonitrile butadiene styrene.

In another embodiment a pool filter core may comprise two portions; wherein the two portions may comprise a first portion and a second portion; wherein each of the portions may be approximately hemi-cylindrical, wherein the two portions each may comprise two vertical edges, a first vertical edge and a second vertical edge; wherein each of the two portions may comprise a plurality of holes; wherein each of the two portions may comprise a plurality of engagement mechanisms; wherein the plurality of engagement mechanisms may comprise a plurality of cavities and a plurality of prongs, which may be configured to matingly engage with each other; wherein the plurality of cavities may be located along the first vertical edge of each of the two portions; and wherein the plurality of prongs may be located along the second vertical edge of each of the two portions; wherein the two portions may be configured to engage with each other along the vertical edges, such that a substantially cylindrical pool filter core may be formed; wherein each of the two portions may comprise a plurality of reinforcement strips; wherein each of the two portions may comprise length reduction planes; wherein the length reduction planes may be orthogonal to a transverse axis of the substantially cylindrical pool filter core; and wherein each of the two portions may comprise a plurality of reinforcement tabs. The portions may be approximately 32.5 inches or 82 centimeters in length. The length reduction planes may be located approximately 13.813, 13.875, 19.313, 19.688, 25.188, 25.750, 26.688, and 31.750 inches or 35, 49, 63, 67, and 80 centimeters from one end of the portions. The plurality of holes may be rounded rectangles.

In some embodiments, the filter substrate may be wrapped around the filter core. The filter substrate may be first pleated or folded in order to increase the effective surface area of the filter substrate usable with the pool filter core, then wrapped around the surface of the filter core.

In some embodiments, the pool filter core may be configured to be cut such that the pool filter core may be made shorter in order to properly fit multiple types of pool filter systems. In some embodiments, the pool filter core may comprise reinforcement strips to ensure the pool core filter may tolerate the stresses applied to it during intended operation as a filter.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As is used in the specification and the appended claims, the singular forms "a," "an," and "the" include plural referents unless the context clearly dictates otherwise. Ranges expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. In the following detailed description, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments.

While multiple embodiments are disclosed, still other embodiments will become apparent to those skilled in the art from the following detailed description. As will be realized, these embodiments are capable of modifications in various obvious aspects, all without departing from the spirit and scope of protection. Accordingly, the screenshots, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

Embodiments of the present invention will now be described, by way of example, with reference to the accompanying drawings.

Figure 1:
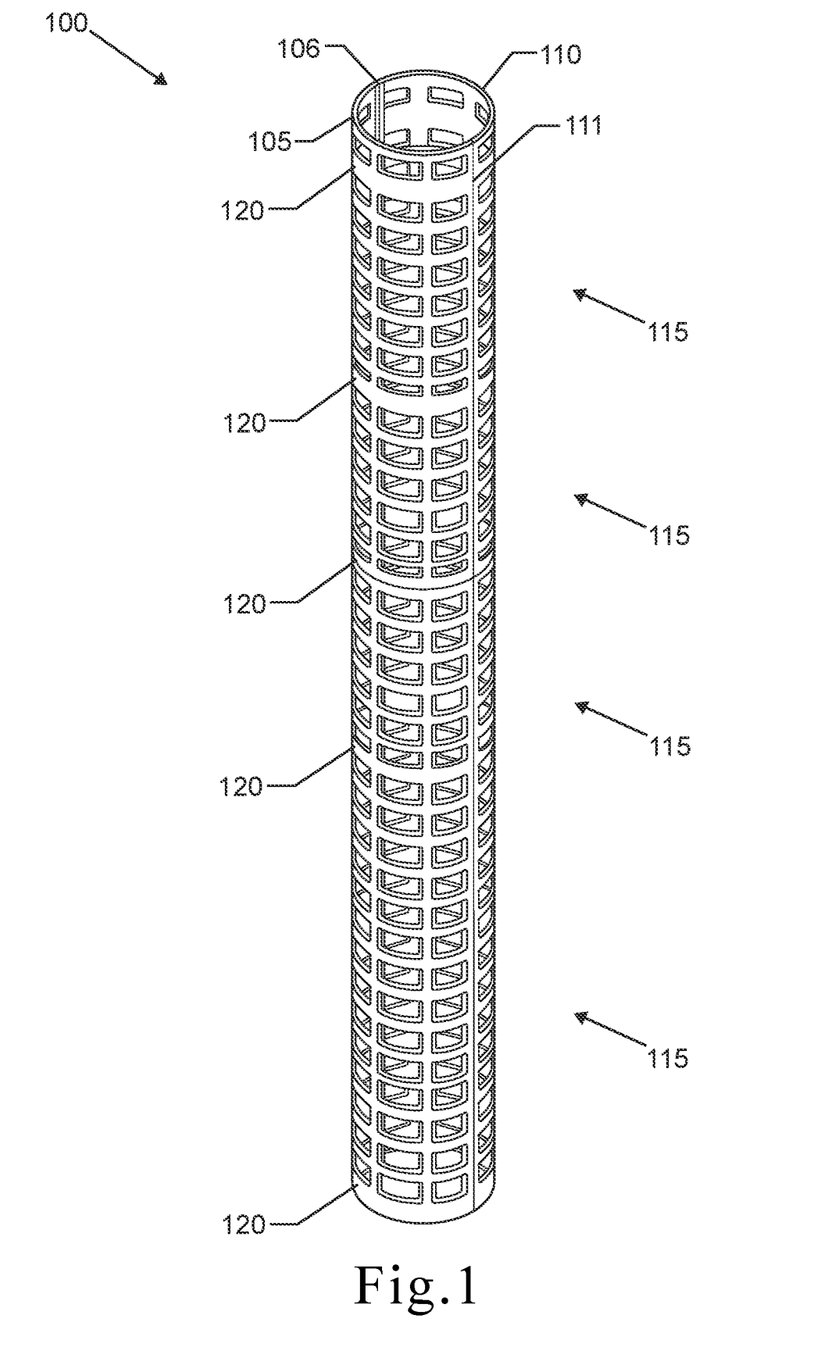
FIG. 1 is an illustration of a front perspective view of one embodiment of a pool filter core.

FIG. 1 is an illustration of a front perspective view of one embodiment of a pool filter core. As shown in FIG. 1, the pool filter core 100 may comprise a first portion 105 and a second portion 110.

The two portions 105, 110 may be truncated cylinders, or otherwise known as half open-cylinders or halved cylinders. In some embodiments, the two portions 105, 110 may be made of thermoplastic, such as acrylonitrile butadiene styrene (ABS), polyvinyl chloride (PVC), plastic, metal, composites, or substantially any natural or synthetic rigid, formable material. Preferably, the two portions 105, 110 may comprise truncated or half cylinders that are approximately equal in size. In some embodiments, the two portions 105, 110 may instead be different sizes. One advantage of the two portions 105, 110 being substantially similar in size is that this may increase the strength of the assembled pool filter core 100 when under pressure or strain. In some embodiments, the two portions 105, 110 may be formed by injection molding. One advantage of having the pool filter core 100 comprise two portions 105, 110 is that doing so allows for a simplified injection molding manufacture process when taken in consideration with the other structural components required for the proper function of the pool filter core 100.

Figure 6:
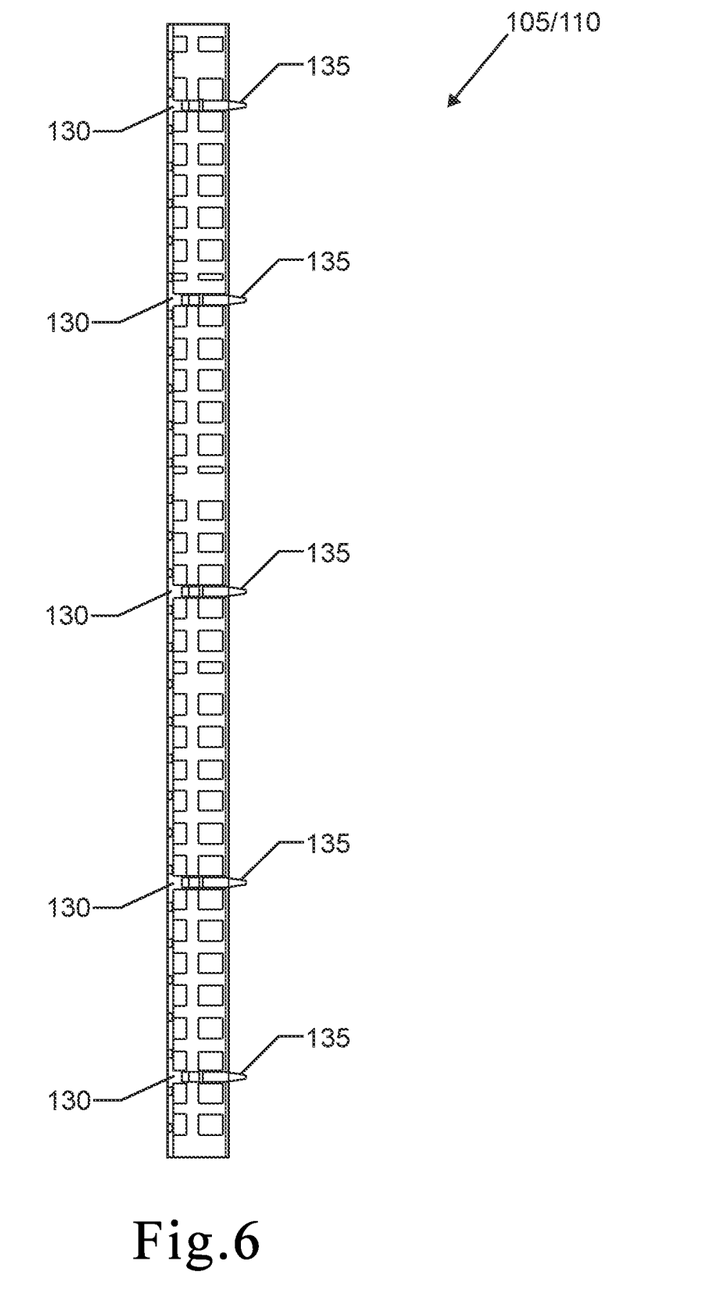
FIG. 6 is an illustration of a side plan view of one embodiment of one portion of a pool filter core.

Each of the two portions 105, 110 may comprise a plurality of holes 115, bands of material 120, reinforcement strips 125 (See FIGS. 3 and 7), and engagement mechanisms 130, 135 (See FIG. 6). In some embodiments, the portions 105, 110 may further comprise reinforcement tabs 950 (See FIG. 9).

The holes 115 may be distributed along substantially the entire length of each of the two portions 105, 110. In a preferred embodiment, the holes 115 may be evenly spaced relative to one another along the entire length of each of the two portions 105, 110. The holes 115 may be substantially any shape, including rounded rectangles as shown in FIG. 1. In alternate embodiments, the holes 115 may be other shapes, such as circles, squares, rectangles, or any other shape. One advantage for the holes 115 being rounded rectangles, is that the two portions 105, 110 remain relatively strong and resilient in the face of pressure during use.

In some embodiments, the evenly spaced pattern of the holes 115 may be interrupted such that solid transverse bands 120 of material exist on the portions 105, 110 where the holes 115 would otherwise be in accordance with the pattern of holes 115. In some embodiments, the solid bands 120 may be designed such that the portions 105, 110 may be cut horizontally along the solid bands 120 to reduce the vertical length of the pool filter core 100. In some embodiments, the solid bands 120 may be placed along the length of the portions 105, 110 so that the pool filter core 100 may be cut and used in a variety of pool filter systems.

In one embodiment, engagement mechanisms 130, 135 (shown in FIG. 6) may be configured to allow the two portions 105, 110 to matingly and securely engage one another to form the preferred cylindrical shape of the pool filter core. The engagement mechanisms 130, 135 may be located along vertical edges 107, 108 (see FIG. 3) of the portions 105, 110. In some embodiments, the engagement mechanisms 130, 135 may be a prong and cavity system configured to matingly engage. In some embodiments, the engagement mechanisms 130, 135 may be configured to permanently engage one another. In some embodiments, the engagement mechanisms 130, 135 may be configured to releasably engage one another.

In a preferred embodiment, each of the two portions 105, 110 may have prongs 135 along a first vertical edge 107 and cavities 130 along a second vertical edge 108. In this embodiment, the two portions 105, 110 are preferably configured to engage one another such that all the prongs 135 on the first portion 105 engage the corresponding cavities 130 on the second portion 110, and vice-versa. In a preferred embodiment, the portions 105, 110 may be approximately 0.250 inches or 0.6 centimeters in thickness. In alternative embodiments, the portions 105, 110 may be between approximately 0.150 and approximately 0.350 inches or 0.3 and 0.9 centimeters in thickness.

In an alternate embodiment, the first portion 105 may comprise prongs along both of its vertical edges 107, 108, while the second portion 110 may comprise cavities along both of its vertical edges. In yet another embodiment, the portions 105, 110 may have prongs and cavities on either of their vertical edges, provided that the other portion has a corresponding complementary prong or cavity in the appropriate location to allow the various prongs and cavities to engage one another.

Figure 7:
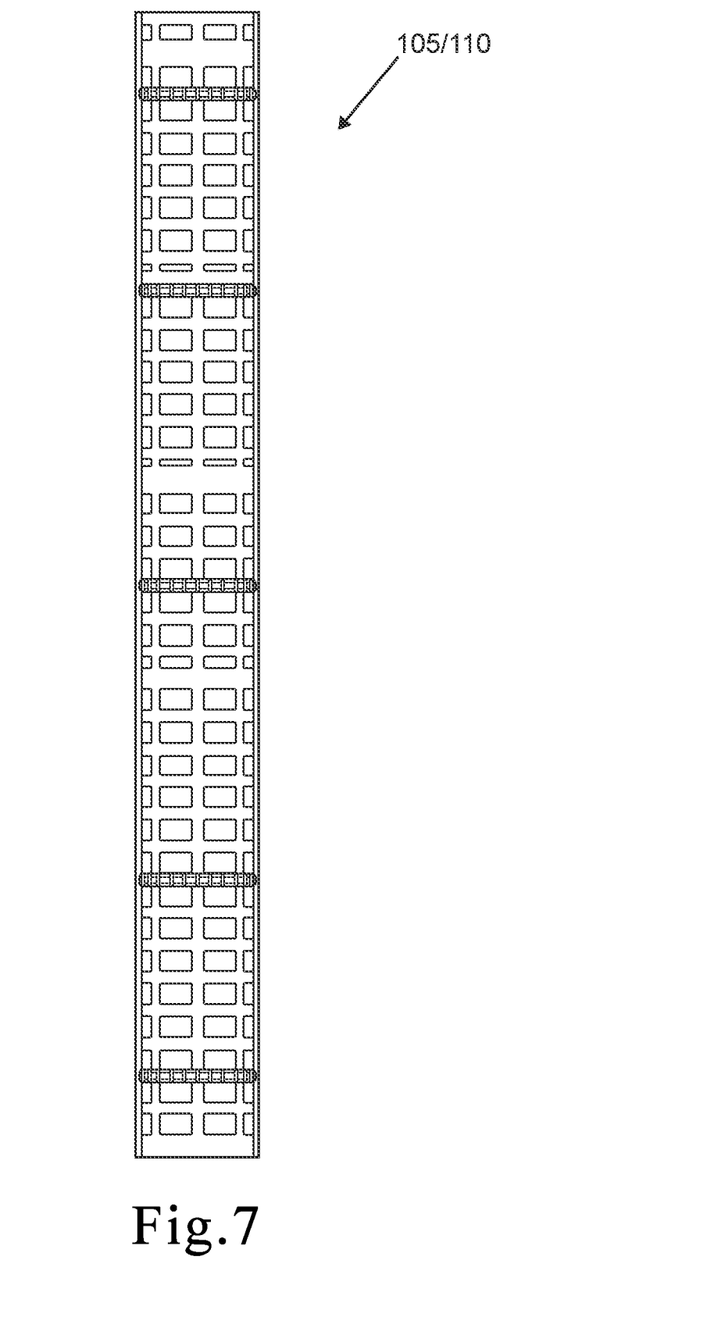
FIG. 7 is an illustration of a rear elevation view of one embodiment of one portion of a pool filter core.
Figure 9:
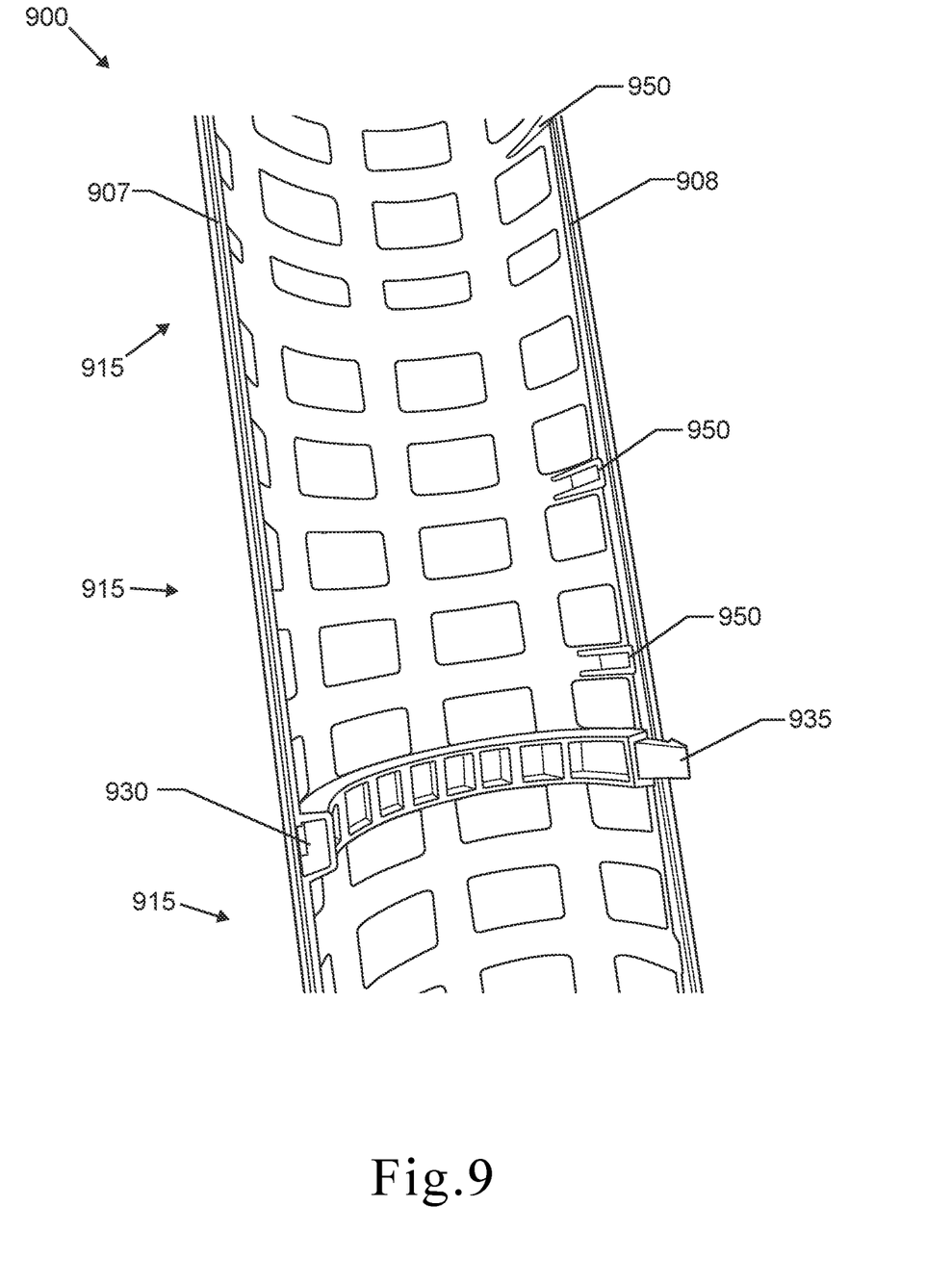
FIG. 9 is an illustration of a rear perspective view of one embodiment of one portion of a pool filter core.

In some embodiments, the reinforcement strips 125 may be positioned on an interior surface of each of the two portions 105, 110, as shown in FIGS. 7 and 9. In some embodiments, the reinforcement strips 125 (shown in FIG. 3) on one of the portions 105, 110 may be configured to line up with reinforcement strips 125 on the other portion 105, 110 when the two portions 105, 110 engage one another. In a preferred embodiment, the reinforcement strips 125 may be approximately .350 inches or .8 centimeters in width. In alternative embodiments, the reinforcement strips 125 may be between approximately .250 and approximately .450 inches or .6 and 1 centimeter in width.

In some embodiments, the pool filter core 100 may have an inner diameter of about 3.25 inches or 8.2 cm, and an outer diameter of about 3.5 inches or 8.9 cm.

Preferably, the reinforcement strips 125 may be located on the inner surface of the portions 105, 110 and abut or incorporate the engagement mechanisms 130, 135. In some embodiments, each of the engagement mechanisms 130, 135 may abut or be incorporated by one of the reinforcement strips 125.

Figure 2:
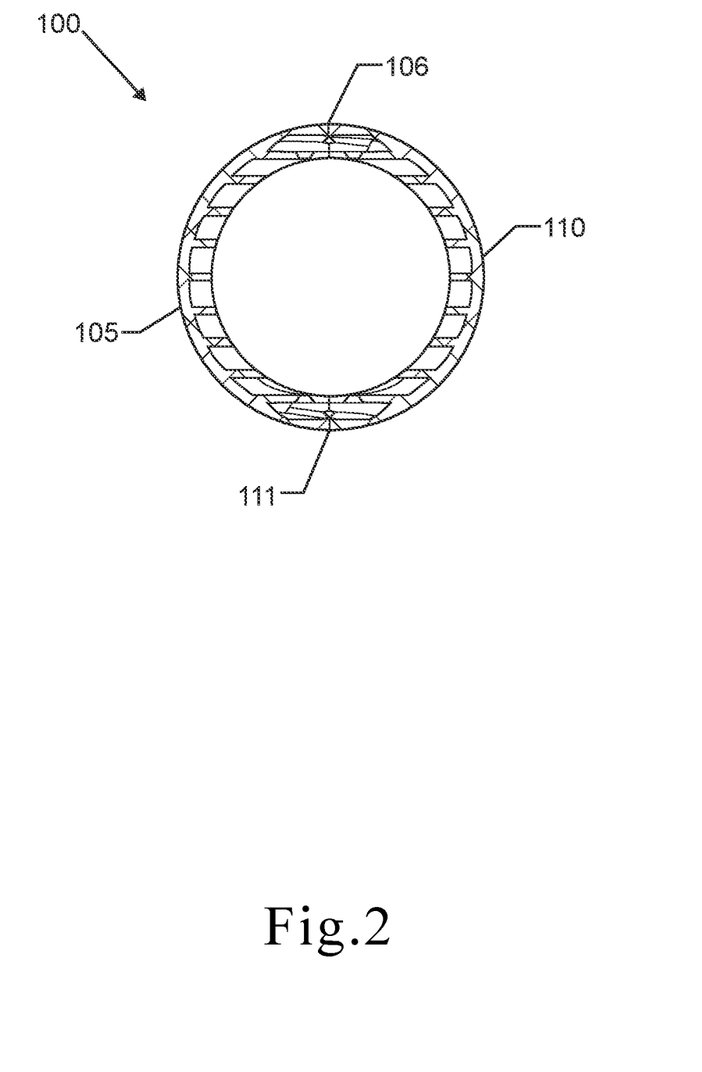
FIG. 2 is an illustration of a top plan view of one embodiment of a pool filter core.

FIG. 2 is an illustration of a top plan view of one embodiment of a pool filter core. As shown in FIG. 2, the pool filter core 100 may be the combination of the first and second portions 105, 110. Additionally, when the first and second portions 105, 110 engage one another, they may form a first seam 106 and second seam 111. In a preferred embodiment, the first seam 106 and second seam 111 may be substantially straight.

Figure 3:
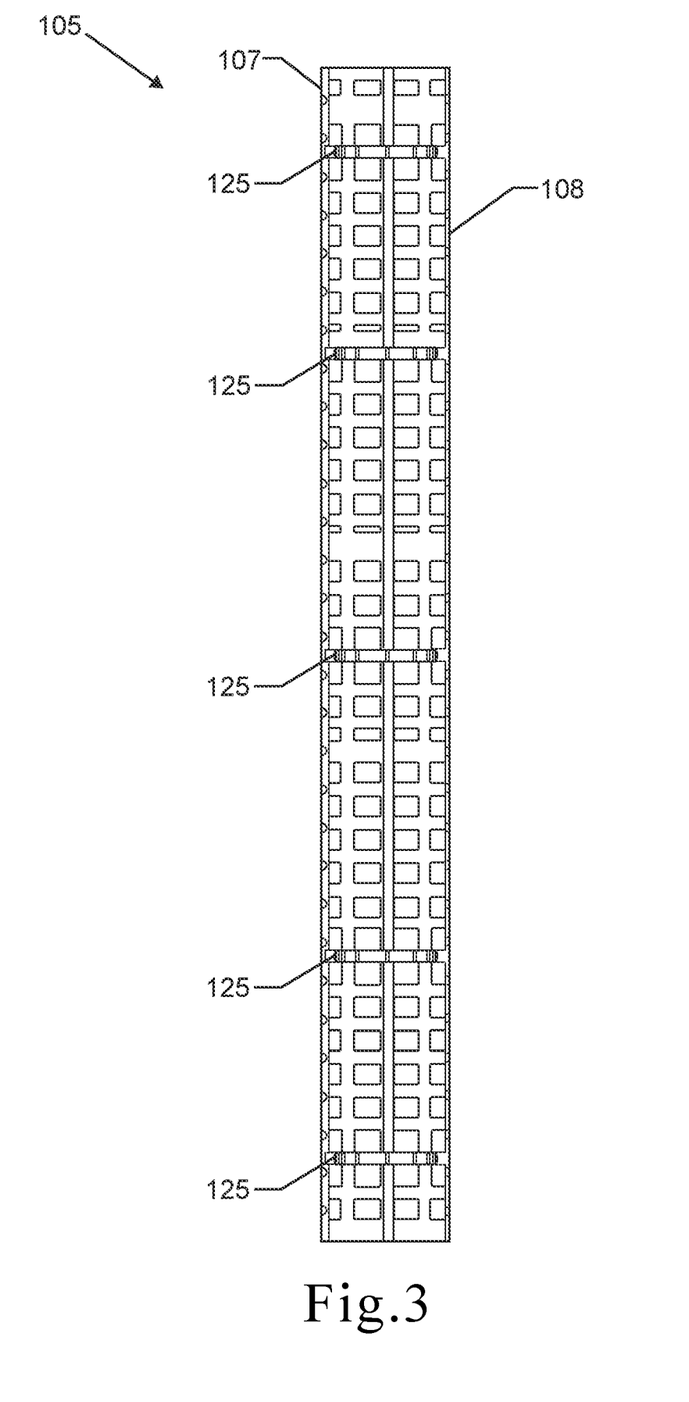
FIG. 3 is an illustration of a front elevation view of one embodiment of one portion of a pool filter core.

FIG. 3 is an illustration of a front elevation view of one embodiment of one portion of a pool filter core. As shown in FIG. 3, the first portion 105 may comprise two vertical edges 107, 108. The second portion may also comprise two vertical edges that are substantially similar or identical to vertical edges 107, 108. In some embodiments, the vertical edges 107, 108 may comprise a lip edge and a lip receiving edge. In some embodiments, the vertical edges 107, 108 may be referred to as alignment edges. FIG. 3 also shows one possible placement of the reinforcing strips 125.

Figure 4:
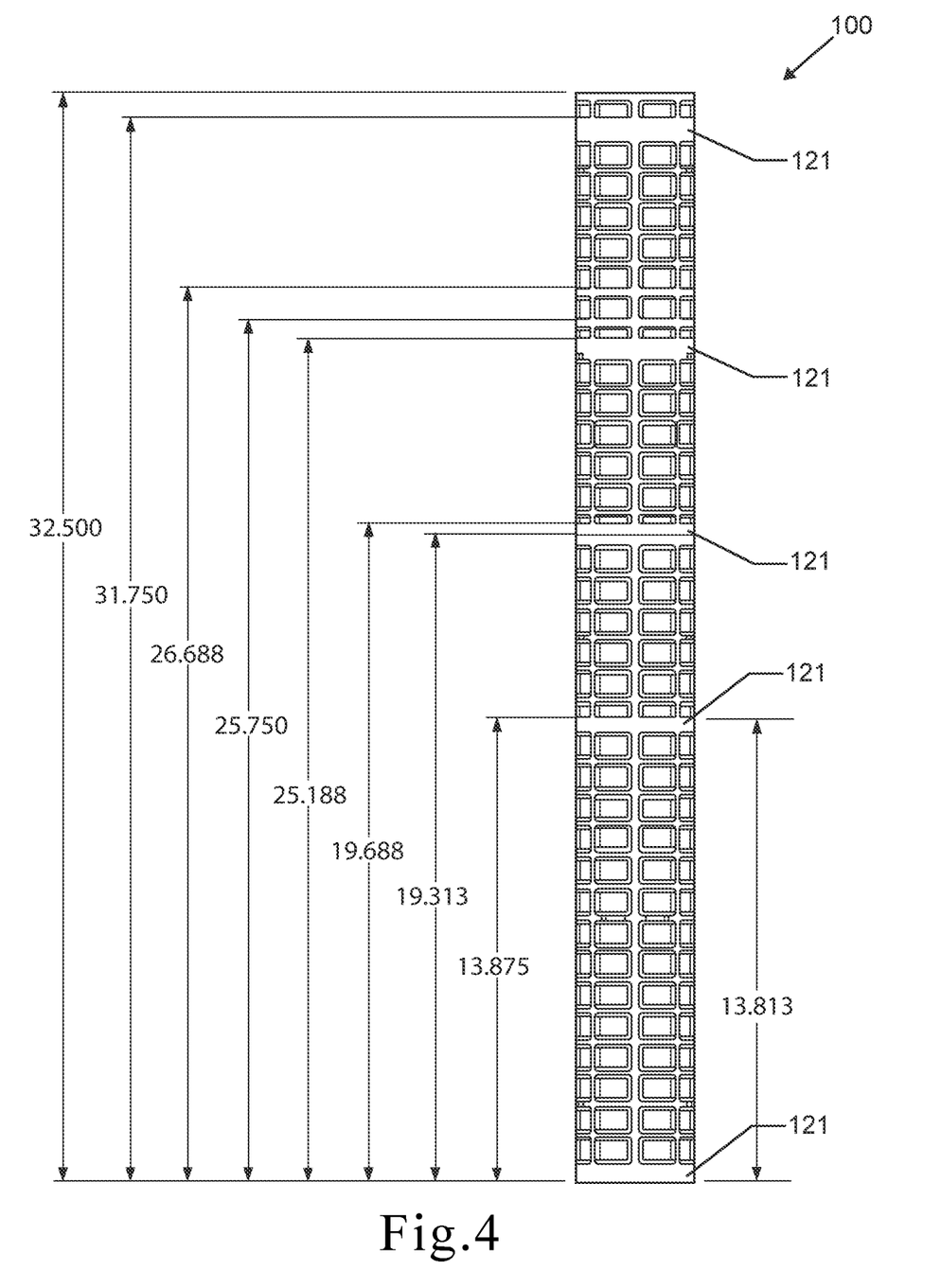
FIG. 4 is an illustration of a front elevation view of one embodiment of a pool filter core showing a plurality of length reduction planes.

FIG. 4 is an illustration of a front elevation view of one embodiment of a pool filter core showing a plurality of length reduction planes 121. As shown in FIG. 4, the pool filter core 100 may comprise a plurality of length reduction planes 121. In a preferred embodiment, the length reduction planes 121 may be horizontal and/or orthogonal to a transverse axis of the pool filter core 100. In one embodiment, the length reduction planes 121 may be located on or near the reinforcement strips 125 and/or reinforcement tabs 950 (similar to those shown in FIG. 9). In a preferred embodiment, the length reduction planes 121 may be located about 1 to 2 inches from the reinforcement strips 125 to accommodate engagement with an end cap and filter manifold. Ideally, the reinforcement strip 125 should not be too close to the end of the filter core 100, where the inside diameter must be precise to fit on a manifold located inside a filter tank.

In a preferred embodiment, the plurality of length reduction planes 121 may be configured such that cutting the pool filter core 100 along the length reduction planes 121 may allow the remaining length of the pool filter core 100 to be configured for use in different pool filter systems that require a shorter length filter. For example, in a pool filter system that requires a pool filter core 100 length of about 13.875 inches or 35 centimeters, a length reduction plane may exist at about 13.875 inches or 35 centimeters from an end of the pool filter core 100.

In a preferred embodiment, the pool filter core 100, when uncut, may be about 32.5 inches or 82.55 centimeters in length, and have length reduction planes 121 at about 13.813, 13.875, 19.313, 19.688, 25.188, 25.750, 26.688, and 31.750 inches, or 35, 49, 63, 67, and 80 centimeters from one end. Preferably, there are no holes 115 along any length reduction planes 121.

Figure 5:
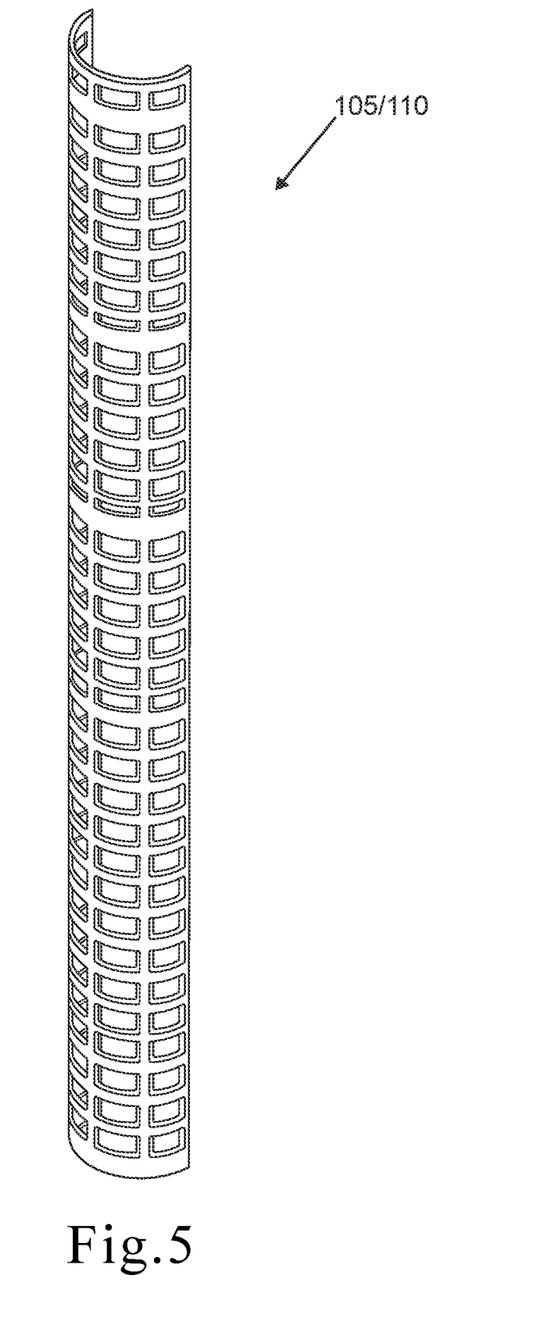
FIG. 5 is an illustration of a perspective view of one embodiment of one portion of a pool filter core.

FIG. 5 is an illustration of a perspective view of one embodiment of one portion of a pool filter core.

FIG. 6 is an illustration of a side plan view of one embodiment of a first portion of a pool filter core. As shown in FIG. 6, the portion (either 105 or 110) may be a halved cylinder that has a plurality of engagement portions 130, 135. FIG. 6 shows that engagement portions 130 are cavities and engagement portions 135 are prongs. In this embodiment, the prongs and cavities are preferably configured to matingly engage with each other.

FIG. 7 is an illustration of a rear elevation view of one embodiment one portion of a pool filter core. As shown in FIG. 7, the total length of the portions 105/110 may be 32.500 inches or 82 centimeters in length. In alternate embodiments, the total length of the portions 105/110 may be between 30 and 35 inches or 76 and 89 centimeters.

Figure 8:
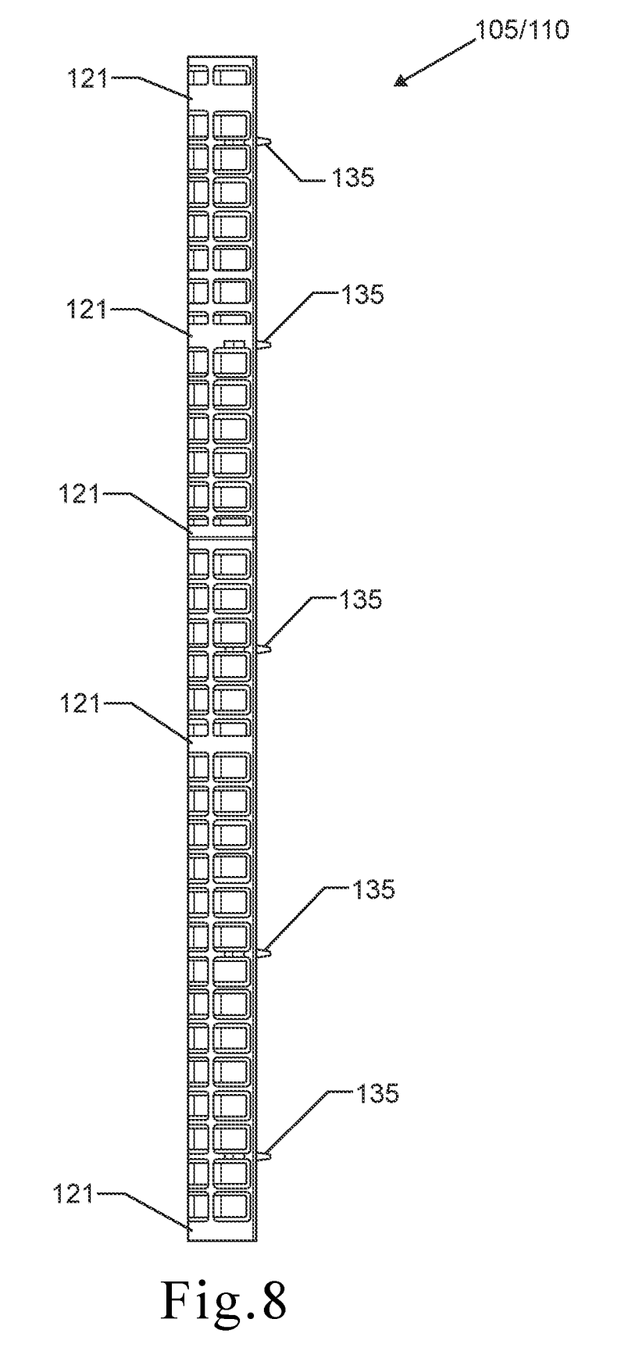
FIG. 8 is an illustration of a side elevation view of one embodiment of one portion of a pool filter core showing a plurality of length reduction planes.

FIG. 8 is an illustration of a side elevation view of one embodiment of one portion of a pool filter core showing a plurality of length reduction planes. As shown in FIG. 8, each of the length reduction planes 121 is in relatively close proximity, but preferably not less than about 1 inch, to at least one engagement portion 135. Preferably, if additional length reduction planes 121 are desired, they may be placed in relatively close proximity to at least one engagement portion 135, or an engagement portion 135 may be added to be in relatively close proximity to the desired additional length reduction plane.

FIG. 9 is an illustration of a rear perspective view of one embodiment of one portion of a pool filter core. As shown in FIG. 9, one portion 900 of the pool filter core may comprise a plurality of holes 915, one or more reinforcement strips 925, one or more reinforcement tabs 950, one or more engagement mechanisms 930, 935, and alignment edges 907, 908.

In one embodiment, the reinforcement tabs 950 may be spaced out such that there is between about 0.5 inches and about 2 inches or 1 and 5 centimeters between reinforcement tabs 950. The reinforcement tabs 950 may abut vertical or alignment edges 907, 908 of the portion 900 and extend perpendicularly therefrom. In a preferred embodiment, there may be at least two holes 915 between successive reinforcement tabs 950. The reinforcement tabs 950 may be additional material incorporated into or structural components affixed to the portion 900 in order to increase strength when the portion 900 engages another substantially similar or identical portion.

In one embodiment, the reinforcement strips 925 may extend from one vertical edge 907 of the portion 900 to the other vertical edge 908 and terminate on either end with the engagement mechanisms 930, 935. The reinforcement strips 925 may be additional material incorporated into or structural components affixed to the portion 900 in order to increase strength when the portion 900 engages another substantially similar or identical portion.

In one embodiment, the alignment edges 907, 908 may comprise two staggered edges, such that a first staggered edge has an outer surface of the portion 900 that extends past an inner surface of the portion 900, while the second staggered edge has an inner surface of the portion that extends past in outer surface of the portion 900. In this embodiment, two substantially identical portions may be configured to engage one another and the alignment edges 907, 908 may function to ensure that the portions are properly aligned when the two portions are put together to form the pool filter core.

Figure 10:
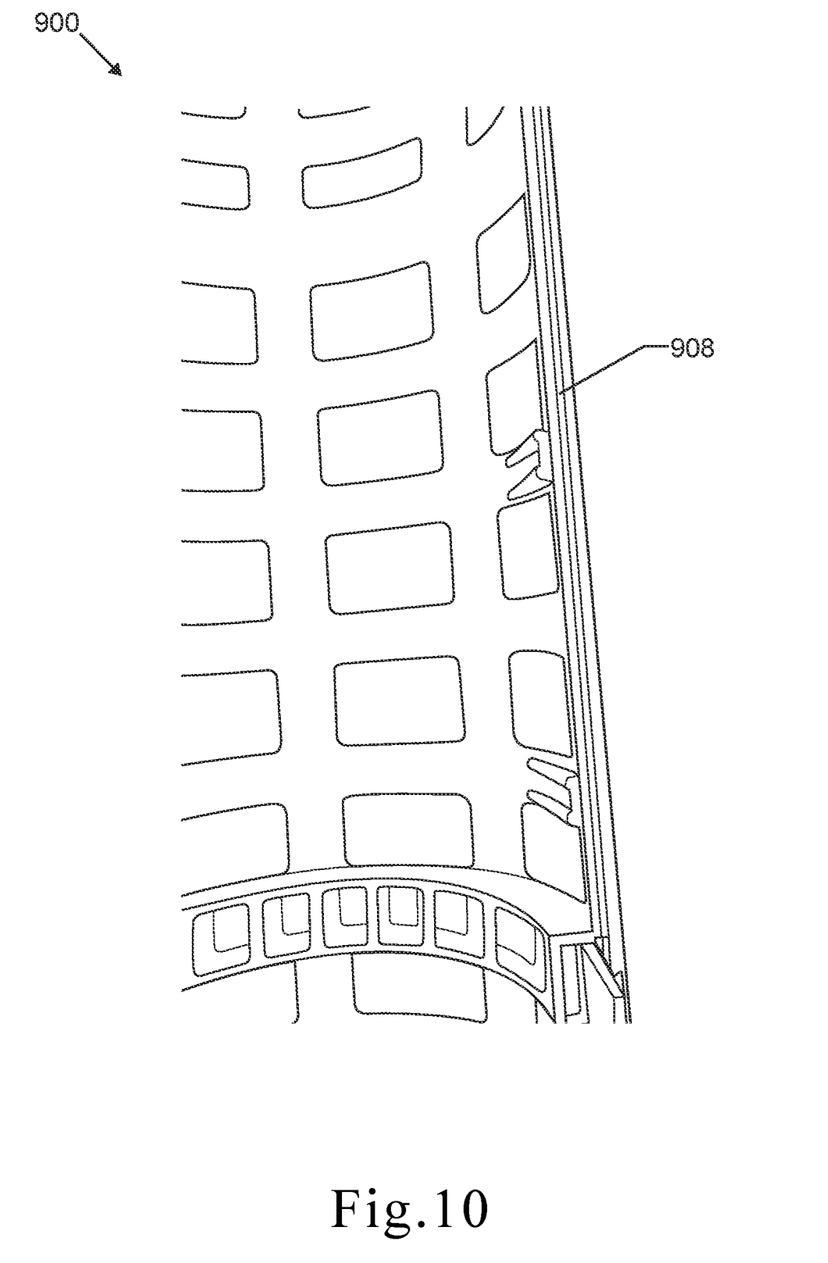
FIG. 10 is an illustration of a rear perspective view of one embodiment of one portion of a pool filter core showing one embodiment of a vertical edge.

FIG. 10 is an illustration of a rear perspective close-up view of one embodiment of one portion of a pool filter core showing one embodiment of a vertical edge. As shown in FIG. 10, the vertical edge 908 may have an outer surface that extends beyond an inner surface. In some embodiments, the vertical edge 908 may be configured to matingly engage and align with another vertical edge of another (typically a second) portion. In alternate embodiments, the vertical edge 908 may be substantially any shape configured to matingly engage and align with another vertical edge of another portion.

Figure 11:
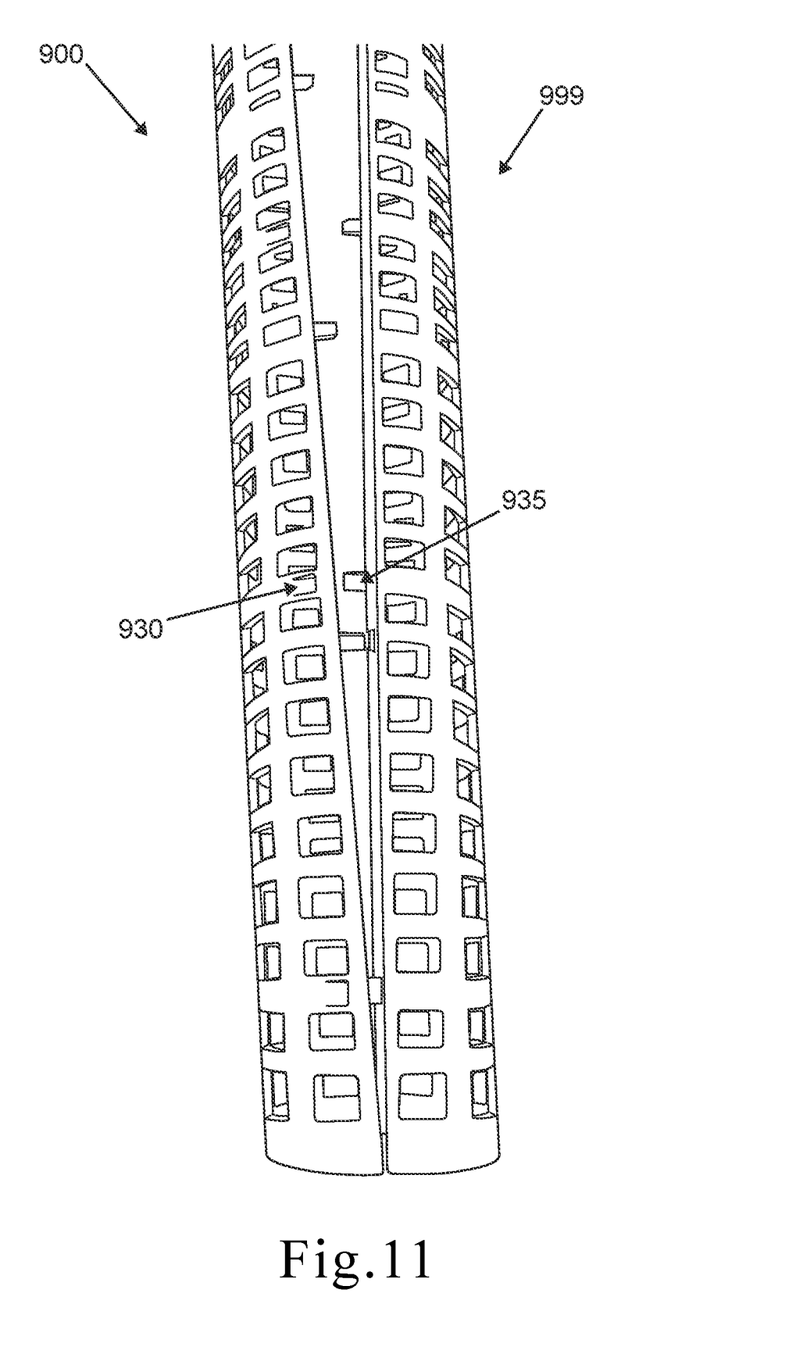
FIG. 11 is an illustration of one embodiment of two portions of a pool filter core that are partially engaged.

FIG. 11 is an illustration of one embodiment of two portions of a pool filter core that are partially engaged. As shown in FIG. 11, the two portions 900, 999 may be substantially identical and be configured to engage one another via the plurality of engagement mechanisms 930, 935.

Figure 12:
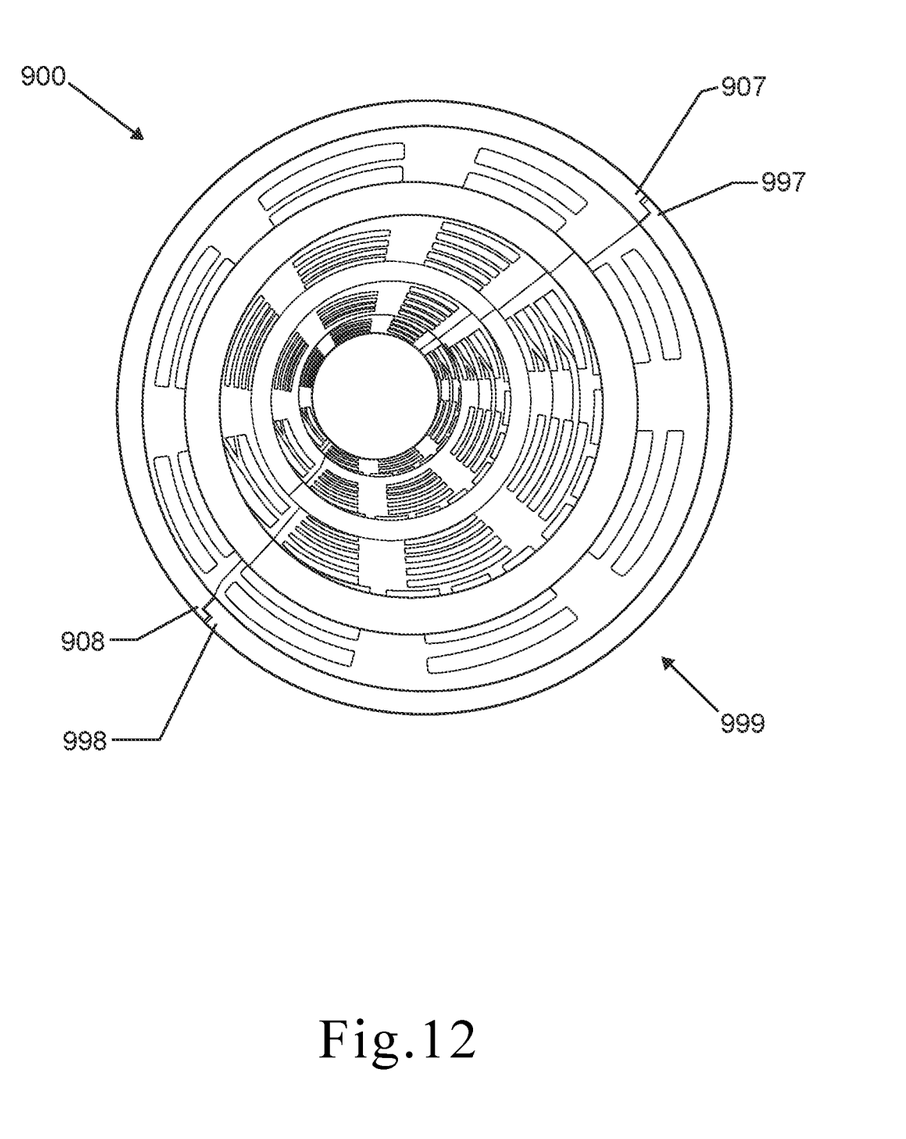
FIG. 12 is an illustration of an interior view of one embodiment of two portions of a pool filter core that are engaged.

FIG. 12 is an illustration of a top plan view of one embodiment of two portions of a pool filter core that are engaged. As shown in FIG. 12, the first portion 900 may comprise a first vertical edge 908 and second vertical edge 907, which are configured to engage the second portion's 999 first vertical edge 998 and second vertical edge 997, respectively. As shown, the first vertical edge 908 of the first portion 900 and the second vertical edge 997 of the second portion 999 may each have an outer surface that extends beyond an inner surface. The second vertical edge 907 of the first portion 900 and the first vertical edge 998 of the second portion 999 may each have an inner surface that extends beyond an outer surface.

Accordingly, the first vertical edge 908 of the first portion 900 may be configured to matingly engage the second vertical edge 998 of the second portion 999. The second vertical edge 907 of the first portion 900 may be configured to matingly engage the first vertical edge 997 of the second portion 999.

Figure 13:
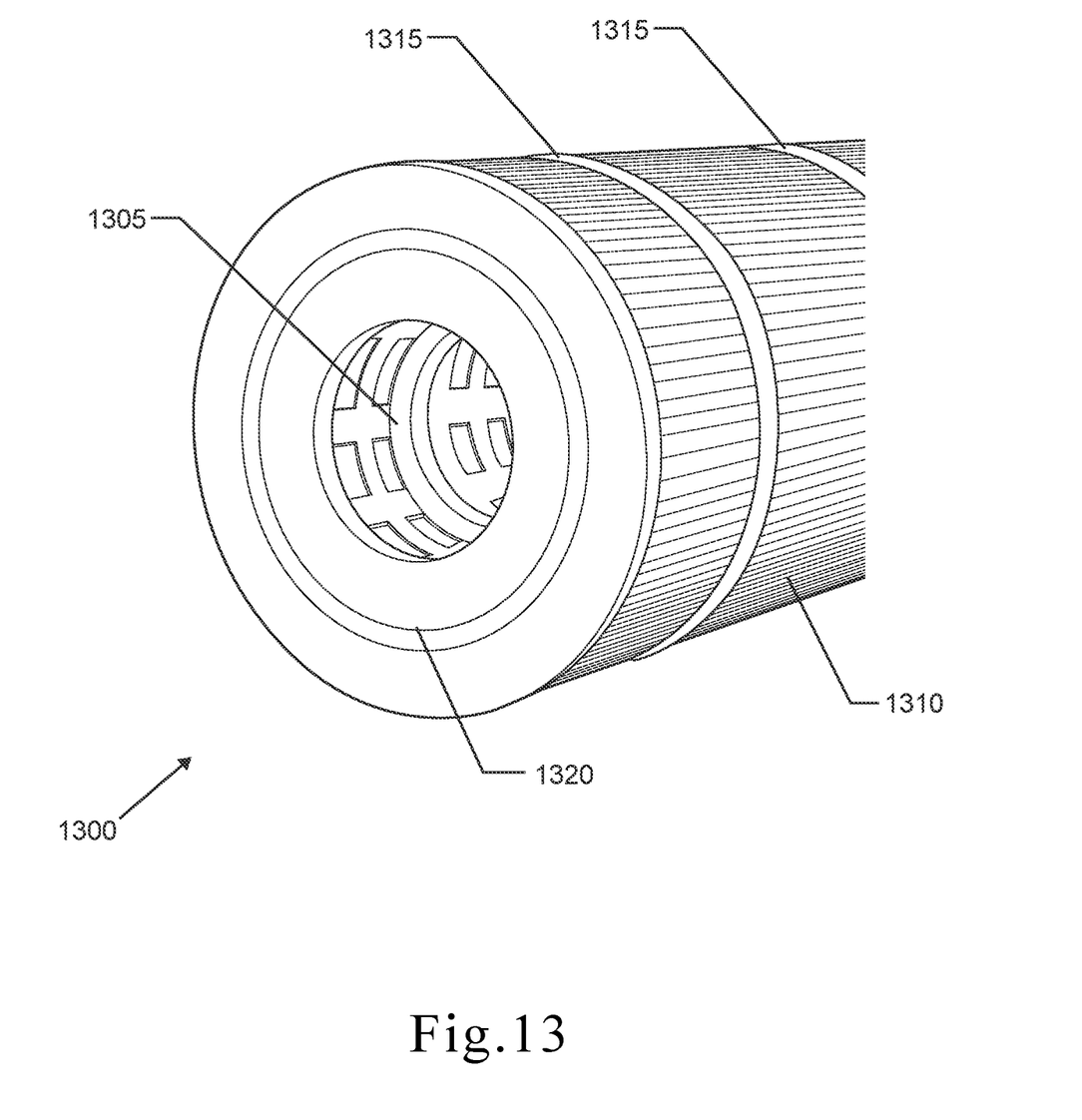
FIG. 13 is an illustration of one embodiment of a pool filter core, filter substrate, bands, and cap.

FIG. 13 is an illustration of one embodiment of an assembled pool filter cartridge. As shown in FIG. 13, the assembled pool filter cartridge 1300 may comprise a pool filter core 1305, a filter substrate 1310, one or more bands 1315, and one or more caps 1320. The filter substrate 1310 may be pleated and/or folded and wrapped around substantially the entire circumference of the pool filter core 1305. The filter substrate 1310 may be held in place by a combination of the bands 1315 and the caps 1320. In one embodiment, after the filter substrate 1310 is wrapped around the pool filter core 1305, caps 1320 may be applied to the ends of the pool filter core 1305 in order to affix the filter substrate to the filter core and allow the assembled pool filter 1300 to engage an intended pool filter system. Then, bands 1315 may be applied around the outer circumference of the pool filter substrate 1310 to further secure the pool filter substrate 1310 when under pressure during intended use in a pool filter tank.

In various embodiments, the caps may be configured to engage the ends of the pool filter core. The caps may be configured to permanently or releasably engage the pool filter core. The caps may be an annulus shape, configured to receive a cartridge filter manifold, hoses or location securing attachments when connected to a pool filter system.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A pool filter core, comprising:
   two portions;
   wherein said two portions comprise a first portion and a second portion;
   wherein each of said portions are substantially partially cylindrical in shape;
   wherein said two portions each comprise a plurality of holes;
   wherein each of said two portions each comprise two vertical edges, such that there is a first portion first vertical edge, a second portion first vertical edge, a first portion second vertical edge, and a second portion second vertical edge;
   wherein each of said two vertical edges of said two portions each comprise a plurality of prongs and a plurality of cavities;
   wherein said two portions are configured to matingly engage with each other, such that a substantially cylindrical pool filter core is formed;
   wherein, when said two portions matingly engage with each other, said plurality of prongs are configured to matingly enter and engage with said plurality of cavities;
   wherein said plurality of cavities on said first portion first vertical edge and said plurality of prongs on said second portion second vertical edge are configured to matingly engage with each other:
   wherein said plurality of prongs on said first portion first vertical edge and said plurality of cavities on said second portion second vertical edge are configured to matingly engage with each other;
   wherein said plurality of cavities on said first portion second vertical edge and said plurality of prongs on said second portion first vertical edge are configured to matingly engage with each other; and
   wherein said plurality of prongs on said first portion second vertical edge and said plurality of cavities on said second portion first vertical edge are configured to matingly engage with each other.

2. The pool filter core of claim 1, wherein each of said two vertical edges of said two portions comprises an alignment edge, such that there are four alignment edges.

3. The pool filter core of claim 2, wherein each of said four alignment edges is either a lip edge or lip receiving edge.

4. The pool filter core of claim 3, wherein said two portions, when engaged with each other, are configured to receive one or more caps; and
   wherein said two portions, when engaged with each other, are configured to be engaged by a pleated filter substrate.

5. The pool filter core of claim 1, wherein each of said two portions comprise a plurality of reinforcement strips; and
   wherein each of said two portions comprise at least one length reduction plane.

6. The pool filter core of claim 5, wherein each of said at least one length reduction planes are orthogonal to a transverse axis of said substantially cylindrical pool filter core; and
   wherein each of said at least one length reduction planes are directly adjacent to said reinforcement strips.

7. The pool filter core of claim 6, wherein each of said two portions comprises a plurality of reinforcement tabs.

8. The pool filter core of claim 7, wherein each of the two portions are approximately 78 to 86 centimeters in length.

9. The pool filter core of claim 8, wherein said length reduction planes are located 35, 49, 63, 67, and 80 centimeters from one end of each of said two portions.

10. The pool filter core of claim 1, wherein said plurality of holes are rounded rectangles.

11. The pool filter core of claim 1, wherein said portions are made of acrylonitrile butadiene styrene.

12. A pool filter core, comprising:
    two portions;
    wherein said two portions comprise a first portion and a second portion;
    wherein each of said two portions are approximately hemicylindrical in shape;
    wherein each of said two portions comprise a plurality of holes, a plurality of reinforcement strips, and one or more length reduction planes;
    wherein each of said two portions comprise two vertical edges, a first vertical edge and a second vertical edge, such that there is a first portion first vertical edge, a second portion first vertical edge, a first portion second vertical edge, and a second portion second vertical edge;
    wherein each of said two vertical edges of said two portions each comprise a plurality of prongs and a plurality of cavities;
    wherein said two portions are configured to matingly engage with each other, such that a substantially cylindrical pool filter core is formed;
    wherein, when said two portions matingly engage with each other, said plurality of prongs are configured to matingly enter and engage with said plurality of cavities;
    wherein each of said two vertical edges of said two portions comprises an alignment edge, such that there are four alignment edges;
    wherein each of said four alignment edges is either a lip edge or lip receiving edge;

wherein said two portions, when engaged with each other, are configured to receive one or more caps;

wherein said two portions, when engaged with each other, are configured to be engaged by a pleated filter substrate;

wherein said one or more length reduction planes are orthogonal to a transverse axis of said substantially cylindrical pool filter core;

wherein each of said one or more length reduction planes are directly adjacent to said reinforcement strips; and wherein each of said two portions comprises a plurality of reinforcement tabs.

13. The pool filter core of claim 12, wherein each of said two portions are approximately 82 centimeters in length.

14. The pool filter core of claim 12, wherein said one or more length reduction planes are located approximately 35, 49, 63, 67, and 80 centimeters from one end of said portions.

15. The pool filter core of claim 12, wherein said plurality of holes are rounded rectangles.

\* \* \* \* \*